(12) United States Patent
Takada et al.

(10) Patent No.: US 8,928,916 B2
(45) Date of Patent: Jan. 6, 2015

(54) DISPLAY DEVICE, PORTABLE TERMINAL, CONTROL METHOD FOR DISPLAY DEVICE, AND PROGRAM PRODUCT

(75) Inventors: Makoto Takada, Matsumoto (JP); Naofumi Hirabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 13/533,389

(22) Filed: Jun. 26, 2012

(65) Prior Publication Data

US 2013/0003123 A1   Jan. 3, 2013

(30) Foreign Application Priority Data

Jul. 1, 2011   (JP) .................................. 2011-147119

(51) Int. Cl.
*G06F 3/12* (2006.01)
*G06K 15/02* (2006.01)
*G06K 15/00* (2006.01)

(52) U.S. Cl.
CPC .......... *G06K 15/022* (2013.01); *G06K 15/1885* (2013.01)
USPC .......... 358/1.15; 358/1.1; 358/1.13; 358/1.18

(58) Field of Classification Search
CPC ... G06K 15/024; B41J 3/4075; G06F 17/212; G06F 3/1251
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| | | | |
|---|---|---|---|
| 2002/0054301 A1 | 5/2002 | Iwai et al. | |
| 2007/0201069 A1* | 8/2007 | Tanaka et al. | ................ 358/1.13 |
| 2010/0162106 A1 | 6/2010 | Ikazaki et al. | |

FOREIGN PATENT DOCUMENTS

| | | |
|---|---|---|
| JP | 2002-55802 A | 2/2002 |
| JP | 2009-39893 A | 2/2009 |
| JP | 2010-149316 A | 7/2010 |

* cited by examiner

*Primary Examiner* — Thierry L Pham
(74) *Attorney, Agent, or Firm* — ALG Intellectual Property, LLC (57) ABSTRACT

A display device which performs previewing of print data for printing an image on a tape including: a division data generating unit for dividing the print data into N parts and thus generates N division data (where N is an integer that is greater than or equal to 1); and a previewing unit for loading a target division data including a target area of the previewing, of the N division data, into a work area and sequentially reads out the division data from the work area, thus performing the previewing; wherein the division data generating unit decides a value of the N in accordance with a tape width of the tape and a tape length in the case where the print data is printed.

11 Claims, 8 Drawing Sheets

DISPLAY DEVICE, PORTABLE TERMINAL, CONTROL METHOD FOR DISPLAY DEVICE, AND PROGRAM PRODUCT

CROSS-REFERENCE

The entire disclosure of Japanese Patent Application No. 2011-147119 filed on Jul. 1, 2011, which is hereby incorporated by reference in its entirety.

BACKGROUND

According to a related art, as a display device of this type, a tape printing device which shows a preview of print data (label image) corresponding to an entire label to be produced while partly scrolling the print data is known (see Japanese Patent Publication No. 2009-039893). Such previewing is carried out in order to present the result of actual print on a label to a user. Thus, the tape printing device of this type generally loads print data of a size suitable for an actual label to be produced, into a work area of the device, and shows a preview of a portion of the label data.

Meanwhile, causing a portable terminal such as smart phone or tablet to start up a label production application and function as a print data producing device is considered recently. In such case, it is conceivable that the related-art configuration is used to produce print data while the previewing is carried out.

However, with the related-art configuration, the volume of print data loaded into the work area for previewing increases as the label to be produced becomes larger. Therefore, when the volume of print data exceeds the capacity of the work area of the portable terminal, previewing may become impossible.

SUMMARY

Various embodiments may provide a display device which can properly perform previewing irrespective of the volume of print data, a portable terminal, a control method for a display device, and program product.

At least one embodiment of the disclosure, there is provided a display device which performs previewing of print data for printing an image on a tape including: a division data generating unit which divides the print data into N parts and thus generates N division data (where N is an integer that is greater than or equal to 1); and a previewing unit which loads a target division data including a target area of the previewing, of the N division data, into a work area and sequentially reads out the division data from the work area, thus performing the previewing. The division data generating unit decides a value of the N in accordance with a tape width of the tape and a tape length in the case where the print data is printed.

At least one embodiment of the disclosure, there is provided a control method for a display device which performs previewing of print data for printing an image on a tape including: (a) generating of N division data (where N is an integer that is greater than or equal to 1) by dividing the print data into N parts; and (b) previewing the division data by loading a target division data including a target area of the previewing, of the N division data, into a work area and sequentially reading out the division data from the work area. In step (a), the display device decides a value of the N in accordance with a tape width of the tape and a tape length in the case where the print data is printed.

At least one embodiment of the disclosure, there is provided a program product embodied in at least one non-transitory computer readable medium and comprising computer instructions executable by a computer and causing a computer to execute each process of the control method for the display device.

With these configurations, since the print data is divided and only the target division data including the target area of the previewing is loaded into the work area, the volume of data loaded into the work area can be restrained. Therefore, even when the volume of the whole of the print data exceeds the capacity of the work area, an inability to show a preview due to an insufficient memory capacity can be eliminated. When the target area of the previewing extends to plural division data, the previewing unit (previewing) loads the plural division data into the work area.

The previewing unit may loads the target division data including the target area of the previewing and neighboring division data next to the target division data, of the N division data, into the work area, and sequentially reads out the division data from the work area, thus performing the previewing.

With this configuration, since the neighboring division data next to the target division data are loaded into the work area in addition to the target division data including the target area of the previewing, the target area of the previewing can be smoothly shifted among the plural division data while the volume of data loaded in the work area is restrained.

It is preferable that the division data generating unit divides the print data into N parts in a direction of tape length and thus generates N division data.

With this configuration, an appropriate preview of the result of print on a tape with a long tape length can be shown.

It is preferable that the division data generating unit generates each division data so that each partial tape length is substantially equal when each division data is printed on the tape.

With this configuration, when the previewing is performed for each division data, the length of data shown in the preview can be made equal. Also, even when the target area of the previewing shifts to different division data, the volume of data loaded in the work area can be made equal.

It is preferable that the display device further includes a flick operation unit for scrolling the previewing.

With this configuration, the target area of the previewing can be shifted by a user's operation.

It is preferable that when the print data includes a character, the division data generating unit sets a division position of each division data so that one character is not divided into two or more of the division data.

With this configuration, a situation where one character exists on the boundary between plural division data, with only a portion of the character shown in the preview, can be avoided.

At least one embodiment of the disclosure, there is provided a portable terminal including: the display device; a print data generating unit which generates the print data; and a print data transmitting unit which transmits the print data to a tape printing device.

With this configuration, a portable terminal which functions as a print data producing device capable of showing an appropriate preview of print data while restraining the volume of data loaded in a work area can be realized.

BRIEF DESCRIPTION OF THE DRAWINGS

The invention will be described with reference to the accompanying drawings, wherein like reference numbers reference like elements.

DESCRIPTION OF EXEMPLARY EMBODIMENTS

Hereinafter, a display device, a portable terminal, and a control method and program for a display device according to an embodiment of the invention will be described with reference to the accompanying drawings. In this embodiment, a print system including a portable terminal functioning as a display device, and a tape printing device, will be described as an example.

Figure 1:
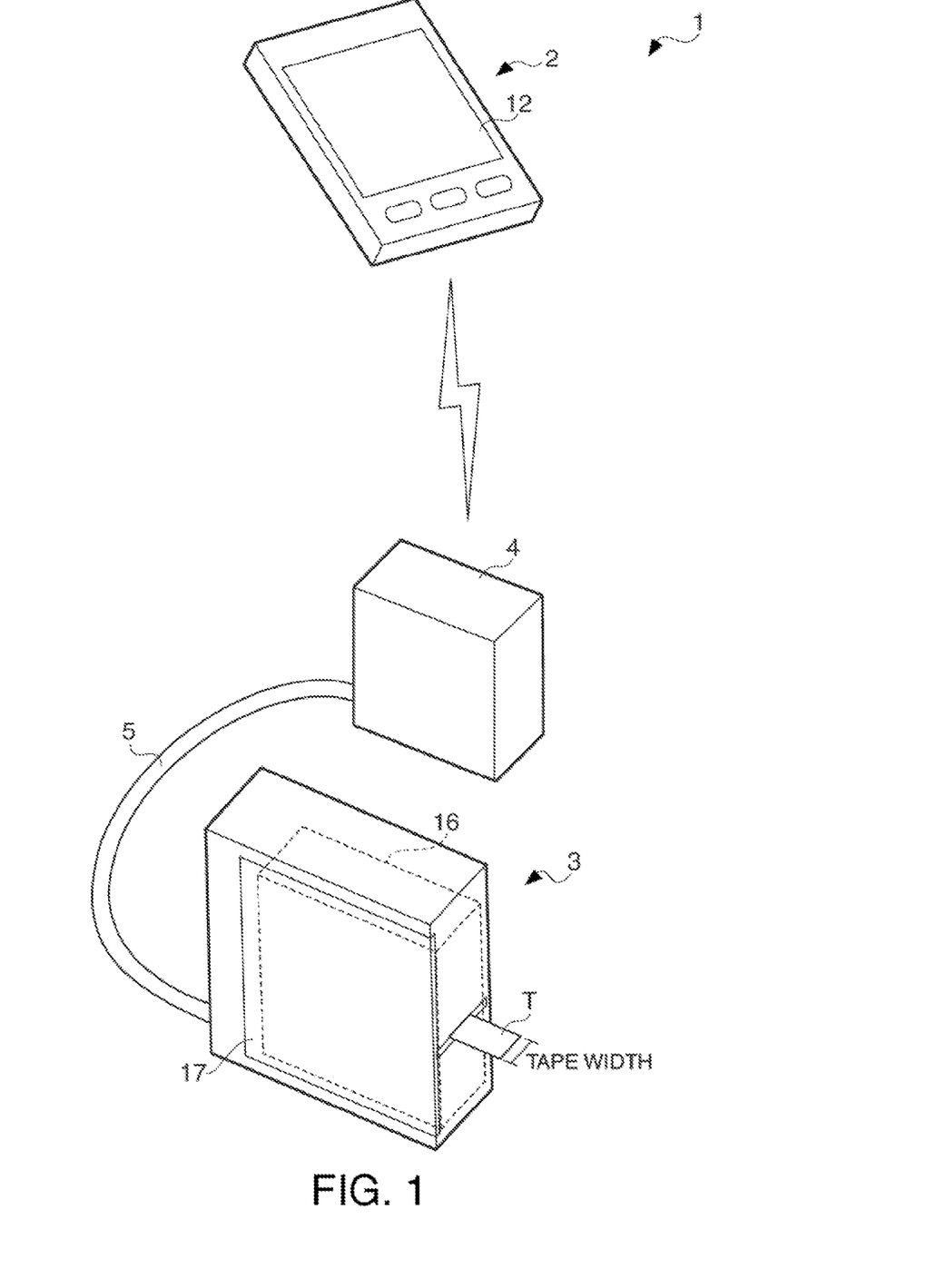
FIG. 1 shows the system configuration of a print system according an embodiment of the invention.

As shown in FIG. 1, a print system 1 includes a portable terminal 2 in which an application for generation of print data is installed, a tape printing device 3 which prints print data generated on the portable terminal 2 onto a print tape T, and a wireless LAN (local area network) router 4. Of these elements, the portable terminal 2 and the wireless LAN router 4 are connected with each other wirelessly. The wireless LAN router 4 and the tape printing device 3 wire-connected with each other via a cable 5. When the print system 1 has plural portable terminals 2, the tape printing device 3 is configured in such a way that the plural portable terminals 2 can share the single tape printing device 3.

The portable terminal 2 is a tablet terminal having a touch panel 12. As an application for generation of print data is installed in the portable terminal 2 and the application is started, the portable terminal 2 functions as a print data generating device which generates print data.

In the tape printing device 3, a tape cartridge 16 housing a long strip-like print tape T in such a way that the tape can be reeled off is installed. The tape printing device 3 performs printing and cutting based on the print data received from the portable terminal 2 while reeling off the print tape T. The tape printing device 3 thus produces a label.

Figure 2:
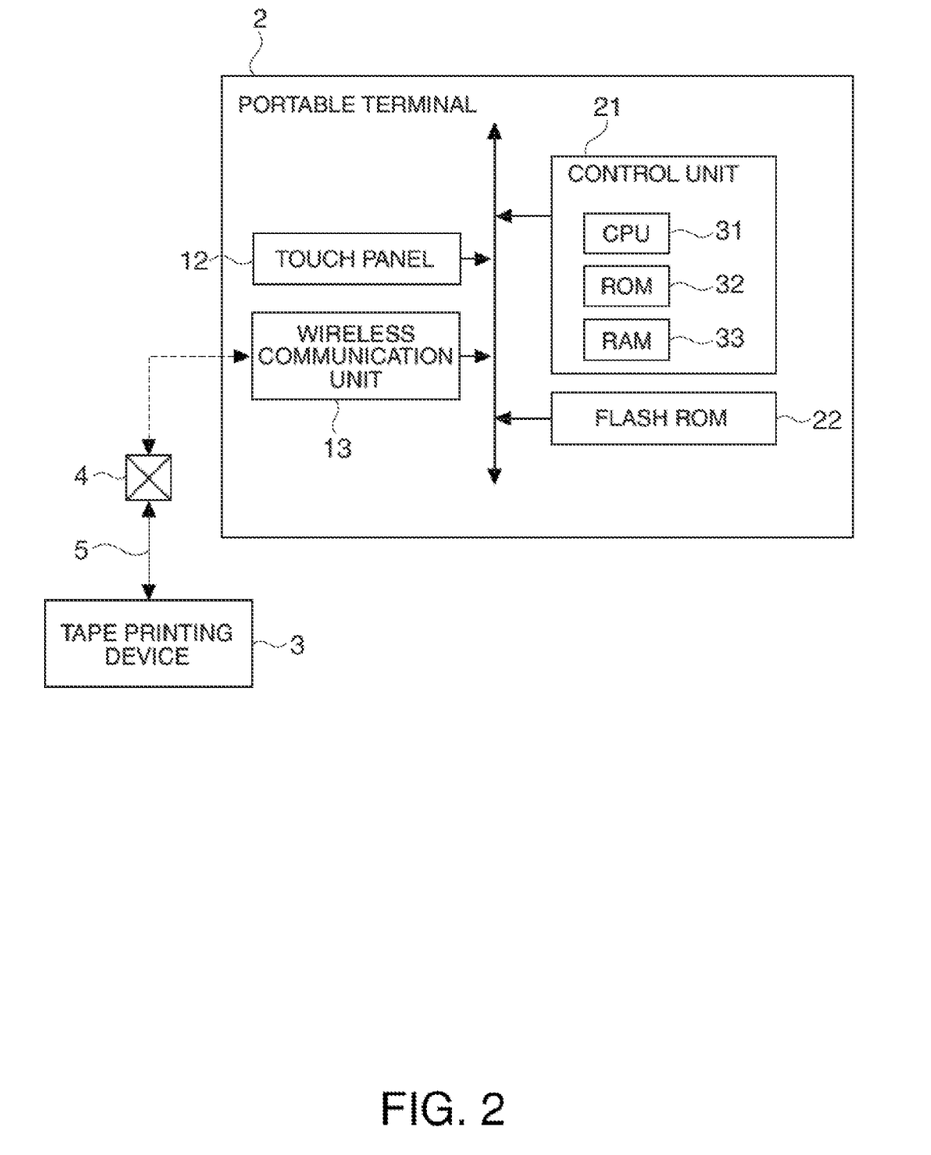
FIG. 2 is a control block diagram of a portable terminal.

FIG. 2 is a control block diagram of the portable terminal 2. As shown in FIG. 2, the portable terminal 2 includes the touch panel 12 as a user interface, a wireless communication unit 13 which communicates with the tape printing device 3 via the wireless LAN router 4, a control unit 21 which controls these elements, and a flash ROM (flash read only memory) 22 which stores various data. The touch panel 12 displays an editing screen D1 for generating print data and a preview display screen D2 for showing a preview of a print result.

The control unit 21 includes a CPU (central processing unit) 31, a ROM (read only memory) 32, and a RAM (random access memory) 33. The CPU 31 is a central processing unit and performs various kinds of arithmetic processing. The ROM 32 stores a control program for the CPU 31 to perform the various kinds of arithmetic processing. The RAM 33 is used as a work area when the CPU 31 performs the various kinds of arithmetic processing. The RAM 33 is also used as a work area where data for previewing is loaded temporarily. The flash ROM 22 stores various data related to the tape printing device 3 and also stores the application of generation of print data. Also, the generated print data and image data generated for previewing and printing are saved in the flash ROM 22.

Figure 3:
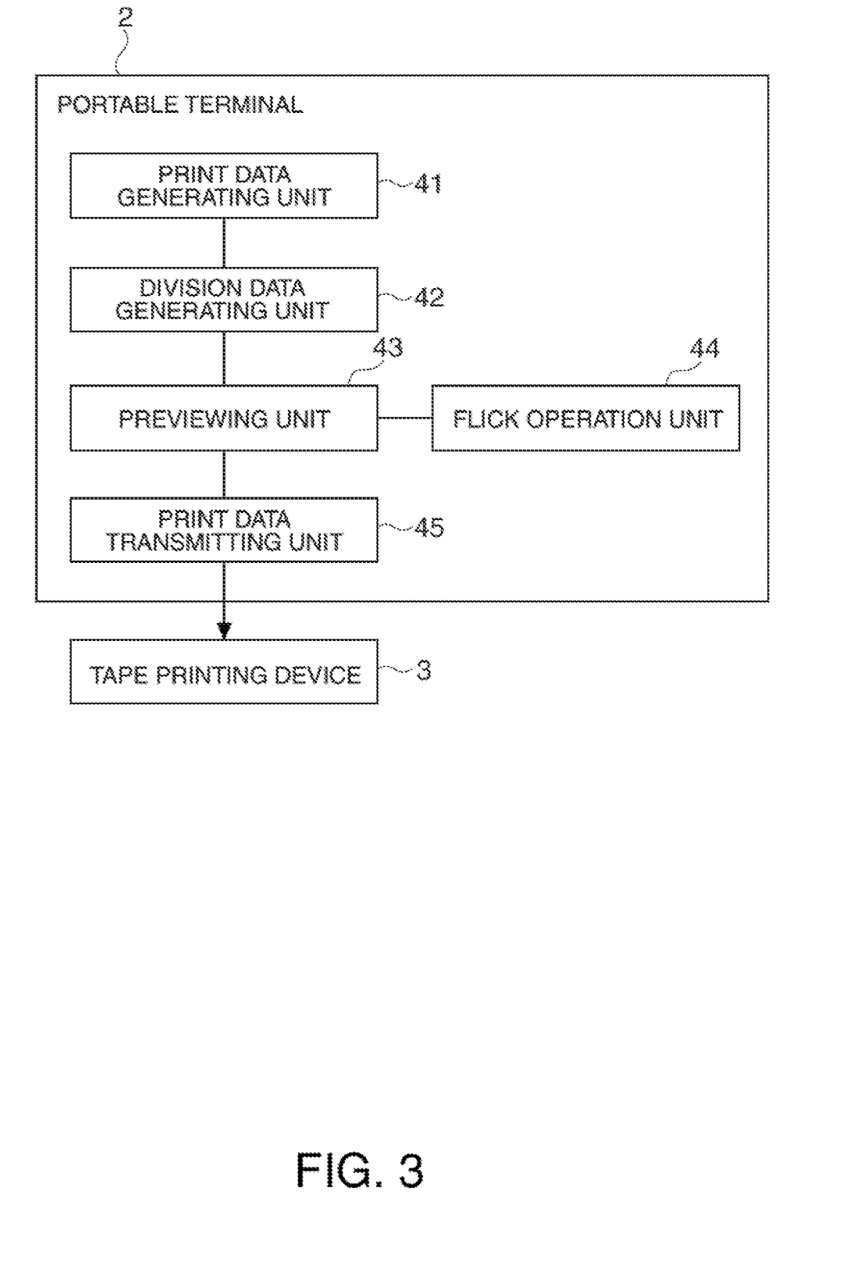
FIG. 3 is a functional block diagram of the portable terminal.

Now, the functional configuration of the portable terminal 2 will be described with reference to FIG. 3. As shown in FIG. 3, the portable terminal 2 has a print data generating unit 41, a division data generating unit 42, a previewing unit 43, a flick operation unit 44, and a print data transmitting unit 45.

The print data generating unit 41 generates print data for printing on the print tape T. The print data is generated based on the result on the editing screen D1. The division data generating unit 42 generates a print image data A of an actual print size based on the generated print data and a tape width that is set, for previewing. The print image data A is bitmap data (image data) of an actual print size corresponding to the number of pixels in the preview display screen D2. The print image data A is then divided to generate division image data B (I11 to I15) (see FIGS. 6A and 6B). That is, the division image data B are bitmap data (image data) obtained by dividing the print image data A into plural parts. The term "print data" in the appended claims refer to the print image data A, and the term "division data" refers to the division image data B.

The previewing unit 43 loads the generated print image data A into the RAM 33 and shows a preview of the print result in the preview display screen D2. Here, the previewing unit 43 loads each division image data B obtained by the division of the print image data A, into the RAM 33, and sequentially reads out the division image data B (I11 to I15) from the RAM 33, thus showing a preview of the print result in the preview display screen D2. In this embodiment, as will be described in detail later, the previewing unit 43 loads division image data B including a target area E6 (previewing target area) having the same area as a preview display area E5 in the preview display screen D2, and division image data B next to the above division image data B, of the print image data A, into the RAM 33, and sequentially reads out the division image data B from the RAM 33 according to change of the target area E6, thus performing previewing. The division of the print image data A (generation of the division image data B) is carried out when the volume of the print image data A exceeds a capacity X of the RAM 33. Thus, the volume of data loaded for previewing can be restrained and therefore an inability to show a preview due to an insufficient memory capacity of the RAM 33 can be eliminated.

The flick operation unit 44 is an operating unit for scrolling the preview on the preview display screen D2, using the touch panel 12 as a main element. The print data transmitting unit 45 uses the wireless communication unit 13 as a main element and transmits the print data edited on the editing screen D1 to the tape printing device 3.

Figure 4:
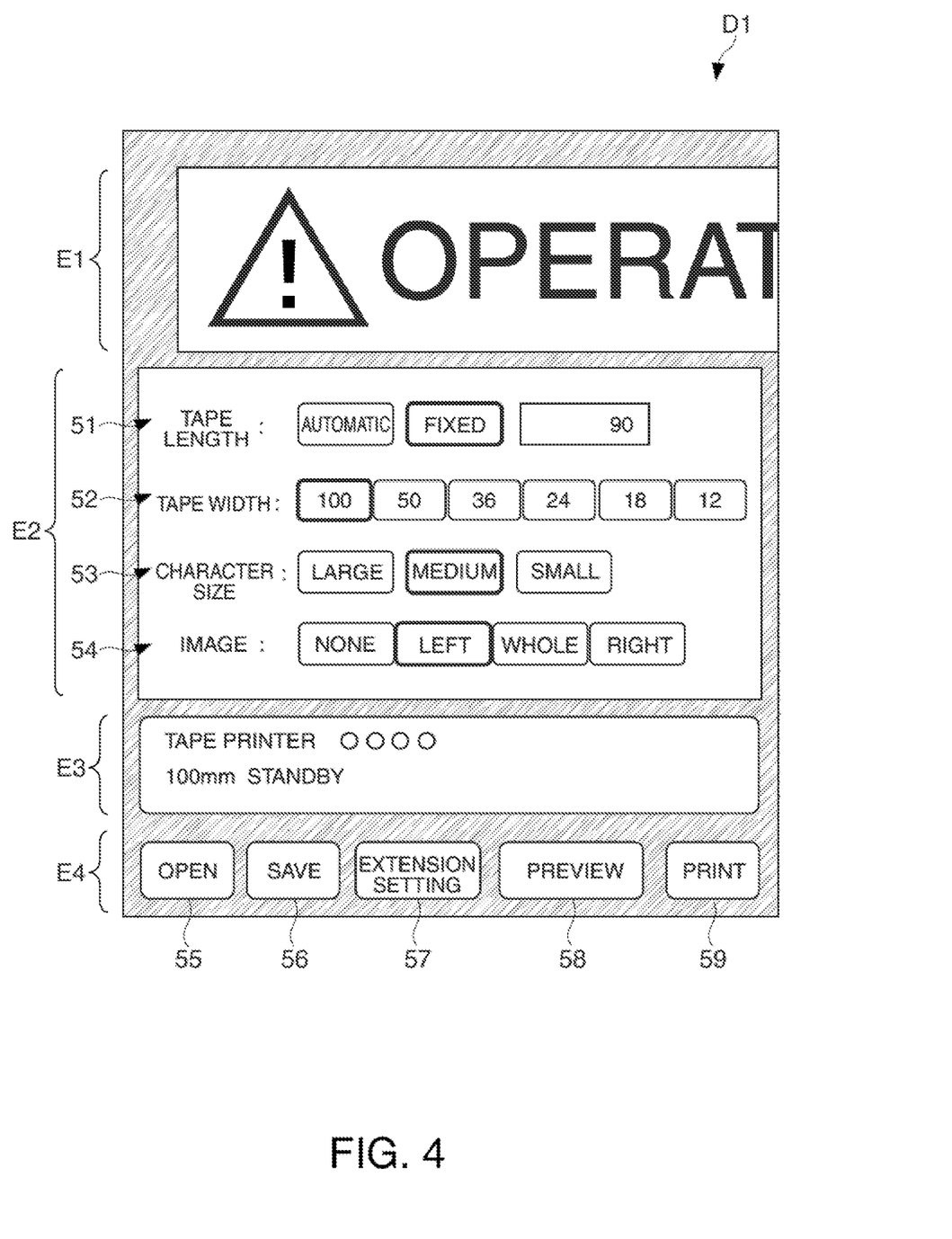
FIG. 4 shows an editing screen.

Next, the screen configurations of the editing screen D1 and the preview display screen D2 will be described with reference to FIGS. 4 and 5. As shown in FIG. 4, the editing screen D1 has an editing result display area E1, a menu display area E2, a status display area E3, and an operation button display area E4.

In the editing result display area E1, print data that is currently edited is superimposed on a tape image that is an image of the print tape T. Scrolling in the direction of tape length is possible by a flick operation (an operation of flicking on the touch panel 12 with a finger). In the editing result display area E1, the tape width of the displayed tape image is fixed irrespective of the tape width set on the portable terminal 2 or the tape width of the actual print tape T installed in the tape printing device 3. That is, in the editing result display area E1, print data obtained by reducing (or enlarging) the actual print result is displayed. In other words, the editing result display area E1 is used to check the layout of the print result and the editing content.

The menu display area E2 includes a tape length setting menu 51, a tape width setting menu 52, a character size setting menu 53, and an image setting menu 54. The tape length setting menu 51 has an automatic setting button for automatically setting the tape length of a label to be produced according to the print data, a fixed setting button for the user to set manually the tape length of a label to be produced, and a text box for inputting the tape length in manual setting. When the user wants to set the tape length manually, the user selects the fixed setting button and then inputs a numerical value of the tape length in millimeters into the text box. As the tape length is manually set, the portable terminal 2 edits the print data to the tape length that is set.

In the tape width setting menu 52, the tape width of the print tape T can be selected from "100 mm", "50 mm", "36 mm", "24 mm", "18 mm", and "12 mm". If the tape width of the actual print tape T installed in the tape printing device 3 is different from the tape width set in the tape width setting menu 52, a pop-up screen is displayed when a print instruction is given (when a "print button" 59, later described, is pressed). In the pop-up screen, three options "Align the tape width and print", "Replace the tape and print", and "Cancel" are displayed, though not particularly shown. Here, when "Align the tape width and print" is selected, the print data is edited (enlarged or reduced) to the tape width of the print tape T installed in the tape printing device 3, and the print data is transmitted to the tape printing device 3. Meanwhile, when "Replace the tape and print" is selected, the replacement of the tape cartridge 16 in the tape printing device 3 is detected, and when it is determined that the tape width of the installed print tape T and the tape width that is set coincide with each other, the print data is transmitted to the tape printing device 3. When "Cancel" is selected, the pop-up screen disappears.

In the character size setting menu 53, the character size of characters (texts) can be selected from "Large", "Medium", and "Small". These "Large", "Medium" and "Small" are relative sizes in relation to the print tape T and therefore are not intended to designate absolute font sizes.

In the image setting menu 54, the inserting position of an image (image data) can be selected from "None", "Left", "Whole", and "Right". Here, when "Left" is selected, the image is arranged to the left in relation to the label (the image is arranged toward the leading end of the tape). When "Right" is selected, the image is arranged to the right in relation to the label (the image is arranged toward the trailing end of the tape). Meanwhile, when "Whole" is selected, the image is enlarged in the direction of tape width and is arranged over the whole label.

In the status display area E3, status information of the tape printing device 3 is displayed. The portable terminal 2 of this embodiment periodically requests the tape printing device 3 to transmit the status thereof. In response to this request, the tape printing device 3 sends back the status information. As the status information, the model name of the tape printing device 3, the tape width, and information indicating the state of the tape printing device 3 (including various kinds of error information) are displayed. Of these, the tape width is information based on a detection result of a tape identification sensor (not shown) of the tape printing device 3.

The operation button display area E4 has an "Open" button 55, a "Save" button 56, an "Extension setting" button 57, a "Preview" button 58, and a "Print" button 59. When the "Open" button 55 is selected, the portable terminal 2 opens a print data file that is saved in advance. When the "Save" button 56 is selected, the portable terminal 2 saves generated print data as a print data file. When the "Extension setting" button 57 is selected, the portable terminal 2 displays an extension setting screen. In the extension setting screen, an image selection button and a QR code creation button are displayed, though not particularly shown. Here, when the image selection button is selected, an image selection screen for selecting a desired image from a list of images is displayed. When the QR code creation button is selected, a QR code creation screen for creating a QR code is displayed.

Meanwhile, when the "Preview" button 58 is selected in the operation button display area E4, the preview display screen D2 (see FIG. 5) is displayed. When the "Print" button 59 is selected, the print data is transmitted to the tape printing device 3. The "Print" button 59 can be pressed only when the print data is confirmed.

Figure 5:
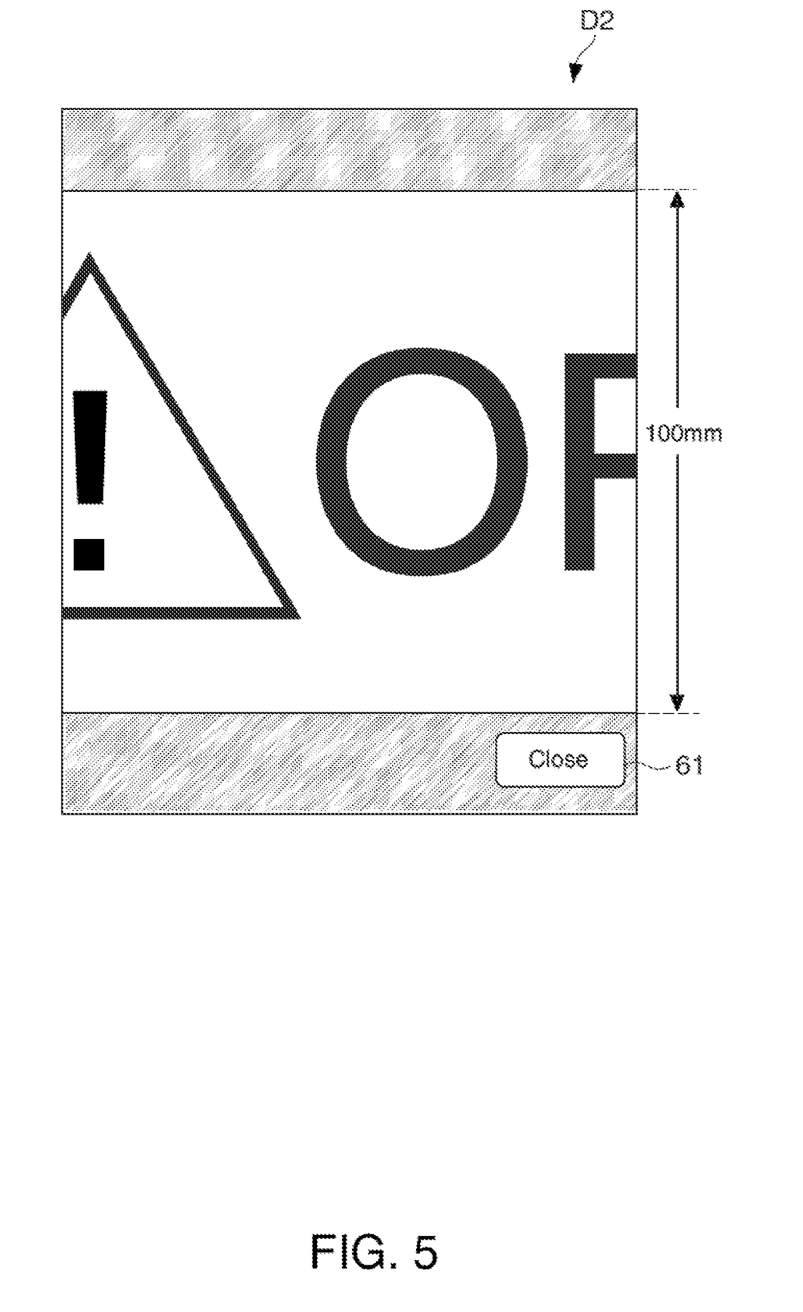
FIG. 5 shows a preview display screen.

FIG. 5 shows the preview display screen D2. The preview display screen D2 has a preview display area E5 in which a preview is shown with an actual size according to the tape width that is set in the tape width setting menu 52. In the example of FIG. 5, since the tape width is set to 100 mm, the width of the tape image for previewing is 100 mm, too. As a preview is shown with an actual size in this manner, a label pasting image can be checked, putting the touch panel 12 of the portable terminal 2 in a place where the label is to be pasted actually. In the preview display screen D2, scrolling in two-dimensional directions is possible by the user's flick operation. When a close button 61 displayed at the bottom right part of the preview display screen D2 is selected, the display returns to the editing screen D1.

Figure 6A:
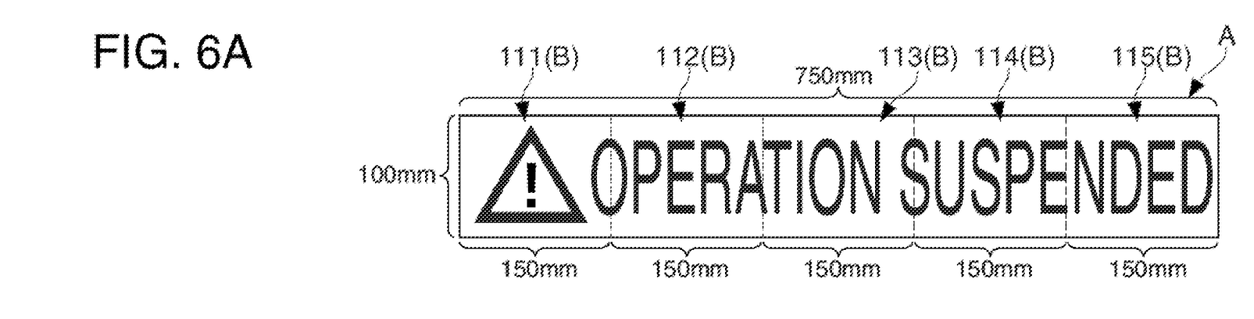
FIGS. 6A and 6B illustrate division of print data.
Figure 6B:
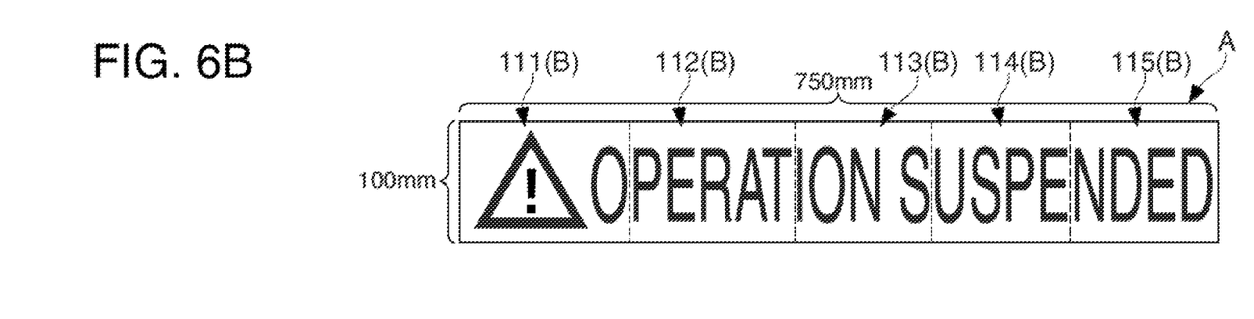

Now, the generation of the division image data B will be described with reference to FIGS. 6A and 6B. Hereinafter, a case where the print image data A is divided in the direction of tape length to generate the division image data B will be described as an example. As shown in FIGS. 6A and 6B, the print image data A has a width of 100 mm, a tape length of 750 mm and an actual print size. FIG. 6A shows the division image data B (111 to 115) obtained by dividing the print image data A displayed in the preview display screen D2 into five equal parts in the direction of tape length. As shown in FIG. 6A, each division image data B has a tape length of 150 mm and is generated by dividing the print image data A in such away that each division image data B has an equal area and data volume.

Meanwhile, FIG. 6B shows the division image data B (111 to 115) obtained by dividing the print image data A at spaces between the characters in the print image data A. That is, the division positions (parts indicated by dotted lines in the drawings) of the print image data A are set in such a way that one character is not divided into two division image data B. Thus, the tape length of each division image data B is different from another. As for the division position, binarized bitmap data (print image data A) may be searched for a portion where no "black" dots exist within at least one line of dot data in the direction of tape width, as a space between characters, and the division position may be set in this portion where no "black" dots exist. Alternatively, a space between characters in bitmap data may be calculated from a space between texts of text data (included in the print data), and the division position may be set in the space between characters.

FIGS. 7A to 7I show screen transition of the previewing and the division image data B loaded in the RAM 33. Shaded parts in FIGS. 7A to 7I represent a previewing target area E6 having the same area as the preview display area E5. For convenience of explanation, the preview display screen D2 where the target area E6 is employed as the preview display area E5 is shown as surrounded by double-dotted chain lines.

Figure 7A:
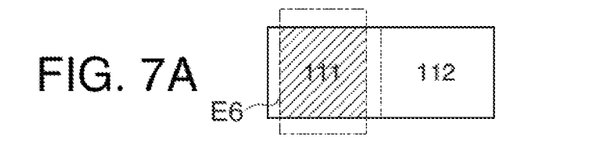
FIGS. 7A to 7I show screen transition of the preview display screen and division image data loaded into a RAM.
Figure 7B:
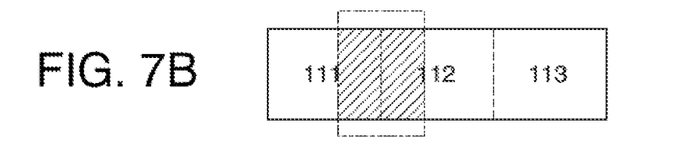
Figure 7C:
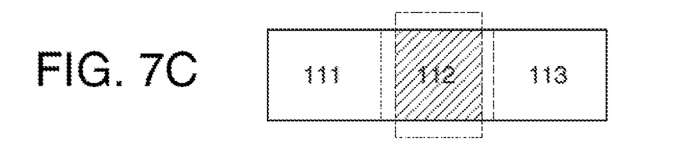
Figure 7D:
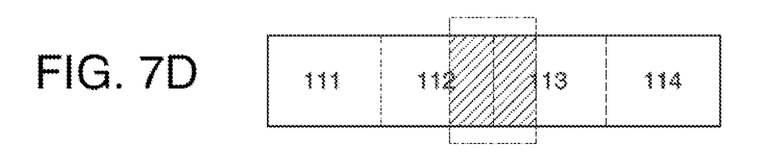
Figure 7E:
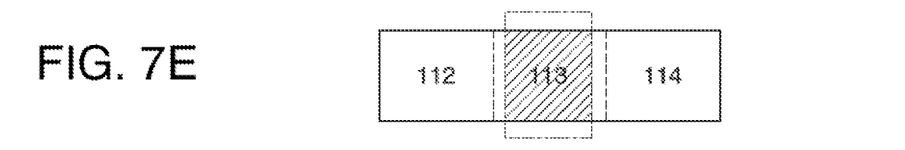

As shown in FIG. 7A, when the target area E6 is within the division image data 111, the division image data 111 including the target area E6 (target division image data) and the division image data 112 next to the division image data 111 (neighboring division image data) are loaded in the RAM 33. As shown in FIG. 7B, when the target area E6 shifts to extend over the division image data 111 and the division image data 112, the division image data 113 next to these division image data is additionally loaded into the RAM 33, in addition to the already loaded division image data 111, 112. This is because the division image data 111, 112 including the target area E6 are loaded into the RAM 33 as target division image data, and the division image data 113 next to these division image data is loaded into the RAM 33 as neighboring division image data. As shown in FIG. 7C, when the target area E6 shifts to fall within the division image data 112, the division image data 112 including the target area E6 is loaded into the RAM 33 as target division image data and the division image data 111, 113 next to the division image data 112 are loaded into the RAM 33 as neighboring division image data. However, the loading content is unchanged from FIG. 7B. As shown in FIG. 7D, when the target area E6 shifts to extend over the division image data 112 and the division image data 113, the division image data 114 next to these division image data is additionally loaded into the RAM 33, in addition to the already loaded division image data 111, 112, 113. This is because the division image data 112, 113 including the target area E6 are loaded into the RAM 33 as target division image data and the division image data 111, 114 next to these division image data are loaded into the RAM 33 as neighboring division image data. As shown in FIGS. 7E to 7I, the division image data B (111 to 115) loaded into the RAM 33 change according to the shift of the target area E6. The term "target division data" in the appended claims refers to the target division image data. The term "neighboring division data" refers to the neighboring division image data.

Figure 7F:
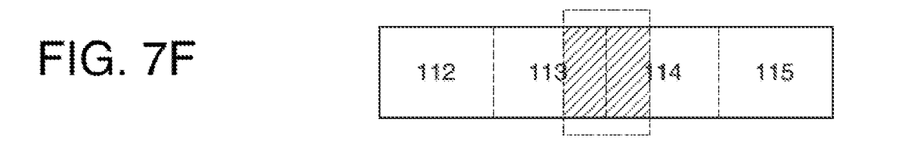
Figure 7G:
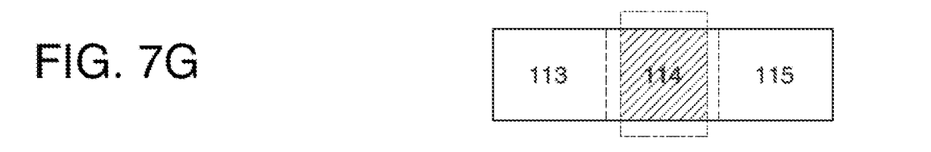
Figure 7H:
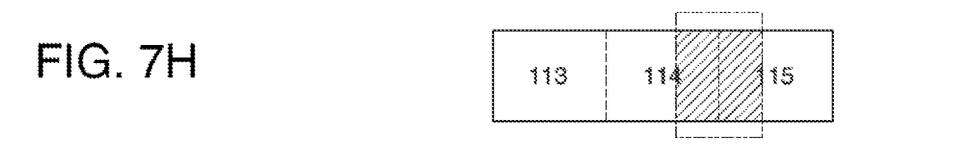
Figure 7I:
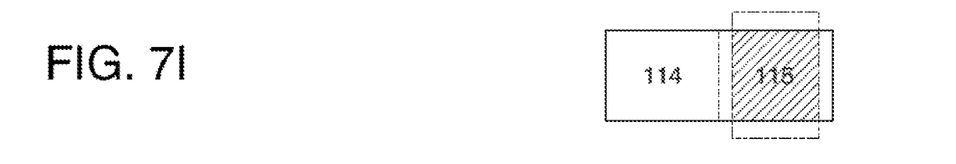

When the print image data A is divided only in the direction of tape length to generate the division image data B, as shown in FIGS. 7A to 7I, the maximum number of the division image data B loaded into the RAM 33 is four (see FIGS. 7D and 7F). Therefore, in the case where the volume of the print image data A exceeds the capacity X of the RAM 33 to generate the division image data B, when the total volume of the four division image data B loaded into the RAM 33 exceeds the capacity X of the RAM 33, previewing is impossible. Therefore, it is desirable that the print image data A is divided into five or more division image data B, with each division image data B having a volume less than X/4. The number of the division image data B that are generated (five or more) is decided in accordance with the volume of print image data that is decided according to the tape width and tape length.

Figure 8:
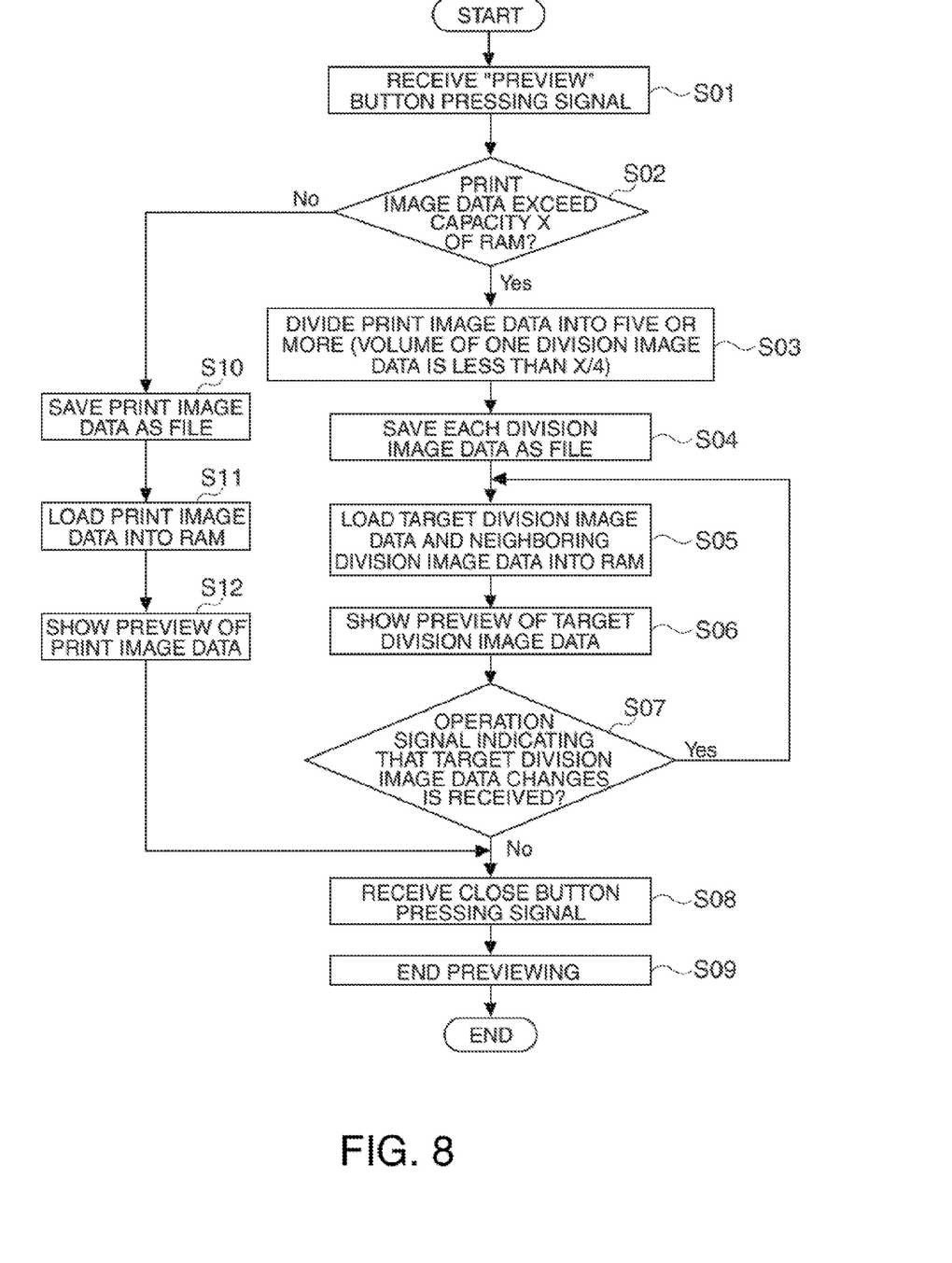
FIG. 8 is a flowchart showing preview processing.

Next, preview processing on the portable terminal 2 will be described with reference to the flowchart of FIG. 8. First, as the portable terminal 2 receives a "preview" button pressing signal (S01), print image data A is generated based on the settings of print data and tape width, and whether the volume of the print image data A exceeds the capacity X of the RAM 33 or not is determined (S02). When the volume of the print image data A exceeds the capacity X of the RAM 33 (S02: Yes), the print image data A is divided into five or more division image data B so that the volume of each division image data B is less than X/4 (S03). Then, each division image data B is saved as a file in the flash ROM (S04). Subsequently, target division image data B including the previewing target area E6 and neighboring division image data B next to the target division image data B are loaded into the RAM (S05). Then, a preview of the target division image data B is shown in the preview display area E5 (S06). Afterwards, as an operation signal indicating that the target division image data B changes is received based on the user's flick operation (S07: Yes), the flow of S05 to S06 is repeated. On the other hand, when an operation signal indicating that the target division image data B changes is not received (S07: No), the processing shifts to S08. As a close button pressing signal is received (S08), the previewing ends (S09).

Meanwhile, when the volume of the print image data A does not exceed the capacity X of the RAM 33 (S02: No), the print image data A is saved as a file in the flash ROM without being divided (S10). Then, the print image data A is loaded into the RAM (S11) and a preview of the print image data A is shown in the preview display area E5 (S12). Subsequently, the flow of S08 and S09 is executed.

With the configuration as described above, when the volume of the print image data A for previewing exceeds the capacity of the RAM 33, the print image data A is divided, and at the time of previewing, the target division image data B including the previewing target area E6 and the neighboring division image data B next to the target division image data B are loaded. Therefore, a preview of the large-volume print image data A can be shown while the volume of loaded data can be restrained. Also, since the neighboring division image data B is loaded in advance, the previewing target area E6 can be smoothly shifted between plural division data next to each other.

In the above description, the case where the print image data A is divided only in the direction of tape length to generate the division image data B is described as an example. However, the print image data A may be divided in the direction of tape width to generate the division image data B. Moreover, the print image data A may be divided in the direction of tape length and in the direction of tape width to generate the division image data B. According to this configuration, the division image data B can be generated appropriately to achieve a more equal data volume, when a preview of the print image data A that is long in the direction of tape width is shown or when the length in the direction of tape width of an area that can be shown as a preview in the preview display screen D2 is shorter than the length in the direction of tape width of the print image data A.

In the above embodiments, the target division image data B including the previewing target area E6 and the neighboring division image data B next to the target division image data B are loaded into the RAM 33. However, a configuration to load only the neighboring division image data B into the RAM 33 may be employed. According to this configuration, the number of the division image data B loaded into the RAM 33 can be reduced.

Each element of the print system 1 described in each of the above embodiments can be provided as a program. Also, the program can be stored in a storage medium (not shown) and provided in this form. As a recording medium, a CD-ROM, flash ROM, memory card, compact disc, magneto-optical disc, digital versatile disk, flexible disk or the like can be used.

The device configurations, processes and the like of the print system 1 are not limited to the above embodiments and can be changed appropriately without departing from the scope of the invention.

What is claimed is:
1. A display device which performs previewing of print data for printing an image on a tape comprising:
    a division data generating unit for dividing the print data into N parts and thus generates N division data (where N is an integer that is greater than or equal to 1) and, when the print data includes a character, for setting a division position of each division data so that one character is not divided into two or more of the division data; and a previewing unit for loading a target division data, which includes only a target area of a previewing and a neighboring division data next to the target division data, of the N division data, into a work area and sequentially reads out the division data from the work area to perform the previewing;

wherein the division data generating unit decides a value of the N in accordance with a tape width of the tape and a tape length in the case where the print data is printed.

2. The display device according to claim 1, wherein the division data generating unit divides the print data into N parts in a direction of tape length and thus generates N division data.

3. The display device according to claim 2, wherein the division data generating unit generates each division data so that each partial tape length is substantially equal when each division data is printed on the tape.

4. The display device according to claim 1, further comprising a flick operation unit for scrolling the previewing.

5. A portable terminal comprising:
the display device according to claim 1;
a print data generating unit which generates the print data; and
a print data transmitting unit which transmits the print data to a tape printing device.

6. A control method for a display device which performs previewing of print data for printing an image on a tape, the method comprising:
(a) generating N division data (where N is an integer that is greater than or equal to 1) by dividing the print data into N parts;
(b) previewing the division data by loading a target division data, which includes only a target area of a previewing and a neighboring division data next to the target division data, of the N division data, into a work area and sequentially reading out the division data from the work area; and
(c) when the print data includes a character, setting a division position of each division data so that one character is not divided into two or more of the division data,
wherein in step (a), the display device decides a value of the N in accordance with a tape width of the tape and a tape length in the case where the print data is printed.

7. The method according to claim 6, wherein the print data is divided into N parts in a direction of tape length and thus generates N division data.

8. The method according to claim 7, wherein each division data is generated so that each partial tape length is substantially equal when each division data is printed on the tape.

9. The method according to claim 6, further comprising
(d) scrolling the previewing by a flick operation.

10. A program product embodied in at least one non-transitory computer readable medium and comprising computer instructions executable by a computer and causing a computer to execute each process of the control method for the display device according to claim 6.

11. The display device according to claim 1, wherein the print data is divided into five or more division data if the volume of the print data exceeds the capacity of the work area.

* * * * *